United States Patent
Farrugia et al.

(10) Patent No.: US 9,499,720 B2
(45) Date of Patent: *Nov. 22, 2016

(54) BIO-BASED BRANCHED RESINS FOR TONER

(71) Applicants: Valerie M Farrugia, Oakville (CA); Rosa M Duque, Brampton (CA)

(72) Inventors: Valerie M Farrugia, Oakville (CA); Rosa M Duque, Brampton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,424

(22) Filed: Dec. 18, 2012

(65) Prior Publication Data

US 2014/0170545 A1    Jun. 19, 2014

(51) Int. Cl.
C08G 63/20 (2006.01)
G03G 9/087 (2006.01)
C09F 1/04 (2006.01)

(52) U.S. Cl.
CPC .............. *C09F 1/04* (2013.01); *G03G 9/08755* (2013.01); *G03G 9/08775* (2013.01); *G03G 9/08795* (2013.01); *G03G 9/08797* (2013.01)

(58) Field of Classification Search
CPC ...... C08G 63/20; C08G 63/42; C08G 63/48; G03G 9/08755; G03G 9/08775; G03G 9/08795; G03G 9/08797
USPC ...................... 528/295.5, 298, 307
See application file for complete search history.

(56) References Cited

U.S. PATENT DOCUMENTS

| 1,998,744 | A | * | 4/1935 | Ubben | 524/386 |
| 8,574,803 | B2 | * | 11/2013 | Sacripante et al. | 430/109.4 |
| 2013/0164668 | A1 | * | 6/2013 | Sacripante et al. | 430/108.1 |

* cited by examiner

*Primary Examiner* — Ling-Siu Choi
*Assistant Examiner* — Gennadiy Mesh
(74) *Attorney, Agent, or Firm* — Hoffman Warnick LLC

(57) ABSTRACT

The present disclosure provides a bio-based, branched polyester resin comprising the condensation product of a hydroxyl donor, including glycerol carbonate, and a cyclic polyhydroxyl acceptor, such as abietic acid, neoabietic acid, palustric acid, levopimaric acid, dihydroabietic acid, pimaric acid, and isopimaric acid, that may be used with a polyacid, including fumaric acid, maleic acid, succinic acid, itaconic acid, dodecylsuccinic acid, glutaric acid, adipic acid, pimelic acid, suberic acid, azelaic acid, and dodecane diacid, to form a polyester useful in manufacturing toner for imaging devices.

14 Claims, No Drawings

BIO-BASED BRANCHED RESINS FOR TONER

FIELD

The disclosure generally is directed to bio-based branched polyester resins as well as toner compositions and developers and the like comprising such bio-based branched polyester resins.

BACKGROUND

Many polyester-based toners are derived using monomers obtained from petroleum or are man-made materials. With an increased focus on impacts on environmental and health, there is an interest and/or a need to find suitable reagent replacements to reduce health risks and negative environmental impact associated with toner production and use.

It is desirable, then, to employ reagents with a lower negative impact on health and the environment for polymer resins useful in toner.

SUMMARY

The instant disclosure provides a bio-based, branched polyester resin comprising biodegradable reagents, which are used in manufacturing toner for imaging devices, where the bio-based content of a resin can be greater than about 90%, greater than about 95%, greater than about 99%, to about 100%.

A bio-based, branched polyester resin is disclosed comprising: (a) a condensation product of a cyclic polyhydroxyl acceptor comprising one or more rings, wherein when two or more rings are present, two or more rings may be fused, for example, a rosin acid, and (b) a hydroxyl donor, such as, glycerine carbonate. Either reagent can comprise one or more functional groups which will be found on the condensation product, which comprises at least two hydroxyl groups, each of which is available for binding to a carboxylic acid group in an esterification reaction. The condensation product, a polyol, is reacted with a polyacid or polyester reagent in an esterification reaction to yield a polyester polymer.

An example of a cyclic polyhydroxyl acceptor is a rosin acid, such as, abietic acid. When treated with, for example, glycerine carbonate in a ring opening condensation reaction, a propylene glycol residue is added at the carboxyl group providing two hydroxyl groups for reaction in an esterification reaction. Optionally, a first catalyst can be included in the condensation reaction.

DETAILED DESCRIPTION

Introduction

The disclosure describes a short chain, branched polyester that can be substantially 100% bio-based, thus, is not dependent on petroleum-based monomers for synthesis, and is biodegradable. Branched polymers are different from linear and cross-linked polymer or polymer networks and display enhanced properties and performance. Even at low concentrations, branched polymers have a significant effect on melt rheology, mechanical behavior and crystallinity with varying degree of branching.

As used herein, a, "cyclic polyhydroxyl acceptor," is a compound comprising at least one ring. If plural rings are present, any two rings may be fused. The acceptor comprises one or more functional groups which are sites for chemical reaction, at least one or two of which are reactive with a hydroxyl donor as described herein to provide a reagent product comprising at least two hydroxyl groups. Following reaction with one or more hydroxyl donor molecules, the product comprises at least two hydroxyl groups, each of which will react with a compound comprising at least one carboxylic acid group in an esterification reaction. Examples of acceptors include rosin acids, such as, abietic acid, neoabietic acid, palustric acid, pimaric acid and so on, anthracenes, phenanthrenes and diterpenes, such as, carnosic acid, ferruginol and so on, benzoic acids, such as, gallic acid and so on. For branching, aside from the sites to enable incorporation of the two reactive hydroxyl groups, an acceptor can comprise one or more reactive sites, such as, a hydroxyl group, which would be the third hydroxyl group on the product following reaction with the hydroxyl donor molecule(s), carboxylic acid group, amine group and so on, which, in the final polyester polymer would serve as sites for reaction within and between chains, that is, branch points.

As used herein, a, "hydroxyl donor," is a compound which by reaction with an acceptor results in the acceptor comprising one or more new or additional hydroxyl groups. The donor can introduce one hydroxyl group, two hydroxyl groups or more to the acceptor in a single reaction. Each of at least two hydroxyl groups on the acceptor is available for reaction with a carboxylic acid in an esterification reaction. While hydroxyl donors are known in the art, examples include polyols, such as, glycerine, propylene glycol, polyethylene glycol and so on, sugar alcohols, such as, mannitol, sorbitol and so on), nonionic surfactants with plural ethoxy groups, such as, four or more, five or more, or more ethoxy groups, such as, polyethylene oxide, fully hydrolyzed polyvinyl alcohol, and so on.

An example of a hydroxyl donor is glycerol carbonate or glycerine carbonate. Glycerine carbonate is available commercially or may be obtained using any of a number of synthetic routes as illustrated below, half of which use glycerol as a starting material.

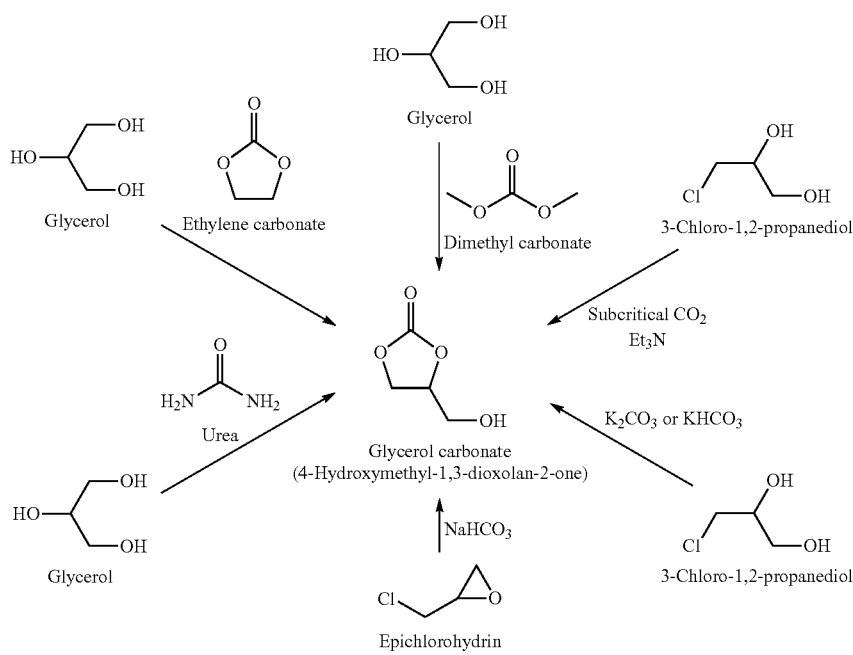

Glycerol carbonate may be substituted to comprise one or more functional groups, which groups are expressed on the adduct following reaction with the acceptor. As noted above, some glycerine carbonate reaction schemes have glycerol as a reactant. As seen above, glycerol is a triol. It is not uncommon for a glycerine carbonate product, whether purchased or synthesized, to comprise an amount of glycerol, for example, about 3-5% residual glycerol. Glycerol is a polyol that can be incorporated into a polyester polymer. Because glycerol is a triol, when incorporated into a polyester polymer, the pendant hydroxyl group is available as a reactive site to function as a branching agent.

A polyalcohol, which can be a hydroxyl donor (or a monomer for the polyesterification reaction), can have the formula $R_3$—$(OH)_3$, wherein $R_3$ is (1) alkyl group, including substituted and unsubstituted alkyl groups, and wherein hetero atoms either may or may not be present in the alkyl group; (2) an alkylene group, including substituted and unsubstituted alkylene groups, and wherein hetero atoms either may or may not be present in the alkylene group, (3) an arylene group, including substituted and unsubstituted alkylene groups, and wherein hetero atoms either may or may not be present in the arylene group; (4) an arylalkylene group, including substituted and unsubstituted alkylene groups, and wherein hetero atoms either may or may not be present in the arylalkylene groups, wherein the alkyl portion of the arylalkylene group can be linear, branched, saturated, unsaturated, and/or cyclic, or (5) an alkylarylene group, including substituted and unsubstituted alkylarylene groups, wherein the alkyl portion of the alkylarylene group can be linear, branched, saturated, unsaturated, and/or cyclic, and wherein hetero atoms either may or may not be present in either or both of the alkyl portion and the aryl portion of the alkylarylene group. The polyalcohol includes, but is not limited to, glycerol, trimethylolpropane, trimethylolethane and hexane triol.

The donor/acceptor reaction to obtain a polyol for use in the esterification reaction is one which is known in the art. For example, the reaction may be a condensation reaction that may require a catalyst. Known catalysts that can be used, for example, in a condensation reaction occurring at a carboxylic acid group on the acceptor include tetraethyl ammonium.

In embodiments, the polyester polymers synthesized as disclosed comprise short-to-medium length chain branches which are long enough to entangle with other chains without extensive interaction between chains to form networks, which can form gels. Gelation of the polymers of interest can be controlled by modulating donor to acceptor ratio, along with the nature and degree of branch points and branching such that polymers containing substantially no gelation; i.e., only low level branching or no branching and no cross-linking can be obtained. The degree of gelation of a polymer can be determined as known in the art, for example, by gel permeation chromatography.

In embodiments, the branched polymers of interest as toner binders provide toners comprising a broader fusing range due to elasticity from polymer chain entanglement. Branched resins may prevent toner from being transferred to the hot surface of a roller (e.g., see U.S. Pub. No. 20110300479, herein incorporated by reference in entirety) and while not being bound by theory, branching may increase maximum fusing temperature (i.e., reduce hot offset).

By way of example, generating a cyclic polyol polyester reactant can be carried out as shown in the reaction scheme below using glycerol carbonate and abietic acid as examples of the donor and acceptor, respectively. In the reaction, tetraethylammonium is used as catalyst.

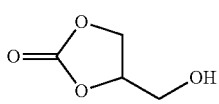

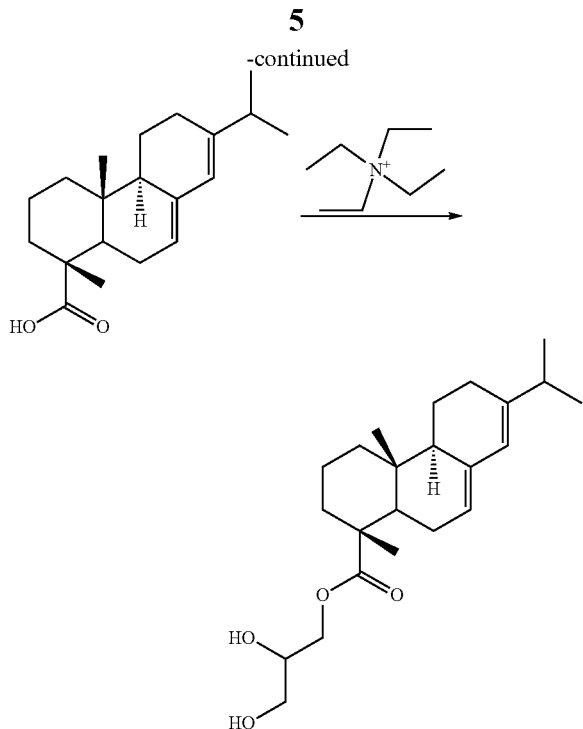

The above reaction forming a rosin diol occurs in absence of a solvent. A side product of the reaction is carbon dioxide. In presence of a catalyst, glycerine carbonate undergoes ring opening leaving two free hydroxyl groups attached to the acceptor molecule via ester linkage at the carboxylic acid site.

The donor to acceptor mole ratio may be from about 0.4:1 to about 1:1 to about 1:0.4, although ratios outside of those ranges can be used as a design choice, and for example, on the number of hydroxyl groups contributed by a donor molecule. When glycerine carbonate is used, glycerol may be present in an amount of about 1% to about 10% by weight of the glycerol carbonate, from about 2 to about 8%, from about 3 to about 7% by weight of the glycerol carbonate, although amounts outside of those ranges can be used.

Suitable catalysts for such a condensation reaction include ammonium or phosphonium salts as well as nucleophiles, such as, imidazoles. There is no work-up necessary after the reaction. Acid value titration may be used to detect completion of reaction; i.e., once all carboxylic acid is reacted with glycerine carbonate, the acid value of the reaction mixture drops to <1 mgKOH/g.

The cyclic polyol synthesized above is reacted with a polyacid (e.g., succinic acid) and an optional second catalyst to form a polyester polymer. In embodiments, the bio-based branched polyester resin exhibits good transition of viscosity from low to high temperature which is characteristic of amorphous resins for EA toner. A bio-based branched polyester resin may exhibit one or more properties including, but not limited to: viscosity ($\eta^*$) plateau at a temperature greater than about 110° C. greater than about 120° C., greater than about 130° C.; a storage modulus (G') plateau at a temperature above about 80° C., greater than about 90° C., greater than about 100° C.; a weight average molecular weight (Mw) from about 400 to about 130,000, from about 500 to about 125,000, from about 600 to about 120,000; a number average molecular weight (Mn) from about 400 to about 1600, from about 500 to about 1,550, from about 600 to about 1,500; a PDI from about 1 to about 70, from about 1.1 to about 65, from about 1.2 to about 60; and a gel content of from about 0.01 wt % to about 20 wt % by weight of the resin, from about 0.015 wt % to about 15 wt %, from about 0.0175 wt % to about 10 wt % by weight of the resin.

As noted above, because the bio-based polyester resins of interest comprise short branches, the resins may be characterized using rheology metrics. For example, rheology values may be measured for the resins using a TA Instruments AR-2000 Advanced Rheometer System. Values measured may include storage modulus (G'), in units of pascals, which is the stress in phase with the deformation divided by the strain, or a measure of elasticity of the sample; loss modulus (G"), in units of pascals, which is the stress 90° out of phase with the deformation divided by the strain, or a measure of the viscous nature of the sample; complex viscosity ($\eta^*$), in units of pascal-seconds, which is the complex modulus divided by the frequency, a value used in shear testing; $\tan_\Delta$, which is the ratio of the loss modulus to the storage modulus and represents the damping properties of the sample; strain, in terms of percentage, which is the amount of deformation of the sample, normalized to take into account the type of geometry (e.g., parallel plate, cone and plate, tensile) and the specimen dimensions; and $\Delta$, measured in radians, which is the angle that indicates the phase shift between the strain wave and the stress wave.

Unless otherwise indicated, all numbers expressing quantities and conditions and so forth used in the specification and claims are to be understood as being modified in all instances by the term, "about." "About," is meant to indicate a variation of no more than 20% from the stated value. Also used herein is the term, "equivalent." "similar," "essentially," "substantially," "approximating" and "matching," or grammatical variations thereof, have generally acceptable definitions or at the least, are understood to have the same meaning as "about."

As used herein, "bio-based," means a compound or product that is composed, in whole or in substantial part (e.g., between about 90% to about 100% by weight, from about 95% to about 100% by weight, from about 98% to about 100% by weight), of biological products or renewable materials (including plant, animal and marine materials) or forestry materials. Bio-based materials are biodegradable.

As used herein, "biodegradable," generally relates to susceptibility of a compound or material to alteration by microbial action or to inherent lability which limits environmental presence or persistence. Bio-based compounds are generally biodegradable. Environmental persistence may be measured as the time necessary for a certain degree of degradation or change, such as, about 50% degradation, over a period of a day, week, month or a minimal number of years, such as, about two years, about three years and so on.

As used herein, a, "linear," polymer forms a long chain without branches or cross-linked structures. The molecular chains of a linear polymer may intertwine but the forces tending to hold the molecules together are physical rather than chemical and thus can be weakened by energy applied in the form of, for example, heat.

As used herein, a, "branched," polymer comprises a chain having division points that connect, for example, covalently, sites within a chain and/or between two or more chains, where branching can occur by replacement of a substituent, e.g., a hydrogen atom, on a monomer subunit, by another covalently bonded chain of that or another polymer. As such, the forces holding the molecules together are less susceptible to weakening by energy applied in the form of, for example, heat (e.g., show greater resistance to change in viscosity as compared to a linear polymer of similar Mw over the same temperature range; viscosity plateau). As provided herein, the branched polymers of interest have shorter chains to provide branching interactions but without the propensity to form networks and gels.

Resins and Polymers

Polyester polymers may be obtained by polycondensation of a cyclic polyalcohol, which optionally may be functionalized, and a polyacid, optionally in the presence of one or more catalysts. The polyester polymers disclosed herein are made from materials that are readily obtainable from renewable sources, that is, are bio-based, and are biodegradable.

Examples of cyclic hydroxyl acceptors are rosin or resin acids, such as, abietic acid (also known as abietinic acid or sylvic acid), that occur widely in trees. Abietic acid is the primary component of resin acid, is the primary irritant in pine wood and resin, is isolated from rosin and is the most abundant of several closely related carboxylic acids that constitute most of rosin, the solid portion of the oleoresin of coniferous trees. Abietic acid can be produced together with oxalic acid, fumaric acid and malic acid in submerged culture anaerobic fermentation by various types of bacteria and molds, Lockwood, "Production of Organic Acids by Fermentation," in Microbial Technology, Peppier & Perlman, eds., Academic Press, New York, pp. 356-387 (1979), the entire disclosure of which is incorporated by reference herein.

Other rosin acids include, but are not limited to, neoabietic acid, dehydroabietic acid, palustric acid, levopimaric acid, pimaric acid, isopimaric acid and combinations thereof, which are isolated from rosin or are available commercially.

Polyols other than those obtained by reacting a cyclic polyhydroxyl acceptor and a hydroxyl donor can be used in the esterification reaction.

The resulting cyclic polyol is combined with a polyacid in an esterification reaction as known in the art. The ratio of cyclic polyol to polyacid generally is one, however, relative amounts that deviate from that even ratio can be used as a design choice. The reaction conditions and reactants are as known in the art. The reaction can include a catalyst.

Suitable polyester monomers and polyacid monomers for the esterification reaction are those which are bio-based and include known polycarboxylic acids, such as, oxalic acid, malonic acid, succinic acid, glutaric acid, adipic acid, pimelic acid, suberic acid, azelaic acid, sebacic acid, undecanedioic acid, maleic acid, fumaric acid, glutaconic acid, traumatic acid, muconic acid, glutinic acid, diabolic acids, methylene succinic acid and so on, isomers thereof, other dioic acid and so on, citric acid, isocitric acid, aconitic acid, trimesic acid, mellitic acid, tricarballylic acid, trimesic acid, isomers thereof, other trioic acids and so on. Essentially any compound that comprises at least two carboxylic acids and is biodegradable, or not, can be used in the practice of the instant subject matter.

Polycondensation catalysts include tetraalkyl titanates, such as, titanium (iv) butoxide or titanium (iv) iso-propoxide; dialkyltin oxides such as dibutyltin oxide; tetraalkyltins such as dibutyltin dilaurate; dialkyltin oxide hydroxides such as butyltin oxide hydroxide, tetraisopropyl orthotitanate, tetrabutyl orthotitanate monobutyl tin oxide, dibutyl tin oxide; aluminum alkoxides; alkyl zinc; dialkyl zinc; zinc oxide; stannous oxide; butyl(hydroxyl)stannanone; tetraethylammonium iodine; and combinations thereof. The catalysts may be used in amounts of from about 0.001 mol % to about 0.55 mol % based on the starting polyacid/polyester and cyclic polyol used to generate the branched polyester resin. In embodiments, the catalysts may be FASCAT 4100, FASCAT 4350, FASCAT 9100.

Polycondensation temperatures range from about 150° to about 250° C., from about 185° C. to about 215° C. Excess polyol may be removed under generated vacuum. Total reaction time may range from about 1 to about 32 hours.

The bio-based, branched polyester polymer is present in an amount from about 60 to about 100 wt % of the toner, from about 70 to about 95%, from about 80 to about 90 wt % of the toner. The bio-based, branched polyester resin may have an Mn of from about 400 to about 1600, from about 500 to about 1550, and an Mw of from about 400 to about 130,000, from about 500 to about 125,000, although, the Mw and Mn may be outside of those ranges. The molecular weight distribution (Mw/Mn) of the bio-based polyester resin may be from about 1 to about 70, from about 1.1 to about 65, from about 1.2 to about 60. The branched polyester resin may have a glass transition temperature (Tg) of from about 5° C. to about 50° C., from about 10° C. to about 40° C., from about 20° C. to about 35° C. The Tg may be outside of those ranges, such as when combined with other amorphous materials. The bio-based branched polyester resin may have a softening point (Ts) of from about 70° C. to about 150° C., from about 85° C. to about 140° C., from about 95° C. to about 120° C. Different softening points may produce toner with different gloss levels. For example, bio-based branched polyester resins having a softening point of about 80° C. to about 95° C. produce toner having a higher gloss than toner produced with resins having a softening point of about 105° C. or higher. The branched polyester resin may have an acid value from about 1 to about 200 mgKOH/g, from about 2 to about 100 mgKOH/g, from about 3 to about 50 mgKOH/g. The bio-based branched polyester may have a % gel content from about 0.001 to about 20%, from about 0.005 to about 10%, from about 0.01 to about 5%.

In embodiments, the reaction for making a bio-based, branched polyester resin may be modulated so that, for example, the average branch number per polyester chain is increased, thereby increasing the maximum fusing temperature of the toner, which enables widening of the fusing temperature range of a toner composition. Controlled branching may be achieved by controlling the ratio and/or reaction of the donor and acceptor until, for example, a suitable softening point is reached.

The bio-based, branched polyester resin may be configured to form a crystalline resin. The crystalline resin may be incorporated by co-emulsification with an amorphous biodegradable branched polymeric resin in the toner composition.

Other Resin Materials

In addition to the bio-based, branched polyester resin described above, the toner compositions may further comprise one or more additional resin materials, as known in the art, to provide desired results. The one or more additional resin materials can be, for example, amorphous, semi-crystalline or crystalline, and can be derived either from petroleum sources or can be bio-based from renewable sources. The additional resin materials can be an acrylate-based resin, a styrene-based resin, a polyester resin or the like. Numerous suitable such resins are known.

Examples of semi-crystalline resins which may be utilized include polyesters, polyamides, polyimides, polyisobutyrate and polyolefins, such as, polyethylene, polybutylene, ethylene-propylene copolymers, ethylene-vinyl acetate copolymers, polypropylene, combinations thereof, and the like. Suitable polyhydroxyalkanoate semi-crystalline resins include polyhydroxybutyrate (PHB), polyhydroxyvalerate (PHV) and copolyesters containing randomly arranged units of 3-hydroxybutyrate (HB) and/or 3-hydroxyvalerate (HV), such as, poly-beta-hydroxybutyrate-co-beta-hydroxyvalerate, and combinations thereof. Other suitable polyhydroxyalkanoate resins are described, for example, in U.S. Pat. No. 5,004,664, the disclosure of which is hereby incorporated by reference in entirety. Commercially available polyhydroxyalkanoates resins which may be utilized include BIOPOL™ (commercially available from Imperial Chemical Industries, Ltd (ICI), England), or those sold under the name MIREL™ in solid or emulsion form (commercially available from Metabolix).

The ratio of the parts by weight of the bio-based, branched polyester resin(s) to the one or more additional resins, such as, a crystalline resin can be from about 100:0 to about 50:50, from about 99:1, from about 95:5 to about 70:30, to about 80:20, based on 100 parts by weight of total resin. The ratio may be outside of those ranges.

Colorants

Suitable colorants include those comprising carbon black, such as, REGAL 330® and Nipex 35; magnetites, such as, Mobay magnetites, MO8029™ and MO8060™; Columbian magnetites. MAPICO® BLACK; surface-treated magnetites; Pfizer magnetites, CB4799™, CB5300™, CB5600™ and MCX6369™; Bayer magnetites, BAYFERROX 86007™ and 8610™; Northern Pigments magnetites, NP-604™ and NP-608™; Magnox magnetites, TMB-100™ or TMB-104™; and the like.

Colored pigments, such as, cyan, magenta, yellow, red, orange, green, brown, blue or mixtures thereof may be used. The additional pigment or pigments may be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE I™ available from Paul Uhlich & Company, Inc.; PIGMENT VIOLET I™, PIGMENT RED 481™, LEMON CHROME YELLOW DCC 1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst. CINQUASIA MAGENTA™ available from E.I. DuPont de Nemours & Co., and the like.

Examples of magenta pigments include 2,9-dimethyl-substituted quinacridone, an anthraquinone dye identified in the Color Index as CI 60710, CI Dispersed Red 15, a diazo dye identified in the Color Index as CI 26050, CI Solvent Red 19 and the like.

Illustrative examples of cyan pigments include copper tetra(octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810. Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants may be used, such as, Levanyl Black A-SF (Miles, Bayer) and Sunsperse Carbon Black LHD 9303 (Sun Chemicals), and colored dyes, such as, Neopen Blue (BASF). Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF). SUCD-Yellow D1355 (BASF). Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that may be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example carbon black, cyan, magenta and/or yellow colorant, may be incorporated in an amount sufficient to impart the desired color to the toner. In general, pigment or dye, may be employed in an amount ranging from about 2% to about 35% by weight of the toner particles on a solids basis, from about 5% to about 25% by weight, from about 5% to about 15% by weight.

In embodiments, more than one colorant may be present in a toner particle. For example, two colorants may be present in a toner particle, such as, a first colorant of pigment blue, may be present in an amount ranging from about 2% to about 10% by weight of the toner particle on a solids basis, from about 3% to about 8% by weight, from about 5% to about 10% by weight; with a second colorant of pigment yellow that may be present in an amount ranging from about 5% to about 20% by weight of the toner particle on a solids basis, from about 6% to about 15% by weight, from about 10% to about 20% by weight and so on.

Surfactants

Toner compositions may be in dispersions including surfactants. Emulsion aggregation methods where the polymer and other components of the toner are in combination may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

The surfactant or the total amount of surfactants may be used in an amount of from about 0.01% to about 5% by weight of the toner-forming composition, from about 0.75% to about 4% by weight of the toner-forming composition, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quaternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

Waxes

The toners of the instant disclosure, optionally, may contain a wax, which may be either a single type of wax or a mixture of two or more different types of waxes (hereinafter identified as, "a wax"). A wax may be added to a toner formulation or to a developer formulation, for example, to improve particular toner properties, such as, toner particle shape, charging, fusing characteristics, gloss, stripping, offset properties and the like. Alternatively, a combination of waxes may be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 wt % to about 25 wt % of the toner particles, in embodiments, from about 5 wt % to about 20 wt % of the toner particles.

Waxes that may be selected include waxes having, for example, a weight average molecular weight of from about 500 to about 20,000, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

Aggregating Factor

An aggregating factor may be used and may be an inorganic cationic coagulant, such as, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium, other metal halides including monovalent and divalent halides, and so on.

The aggregating factor may be present in an emulsion in an amount of, for example, from about 0 to about 10 wt %, from about 0.05 to about 5 wt % based on the total solids in the toner.

The aggregating factor may also contain minor amounts of other components, for example, nitric acid.

In embodiments, a sequestering agent or chelating agent may be introduced after aggregation is complete to sequester or to extract a metal complexing ion, such as, aluminum, from the aggregation process. Thus, the sequestering, chelating or complexing agent used after aggregation is complete may comprise a complexing component, such as, ethylenediaminetetraacetic acid (EDTA), gluconal, hydroxyl-2, 2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, and mixtures thereof.

Toner Particle Preparation

The toner particles may be prepared by any method within the purview of one skilled in the art, for example, any of the emulsion/aggregation methods may be used with the bio-based, branched polyester resin of interest. However, any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material; other mechanical processes; any process for producing nanoparticles or microparticles; and so on, if a polyester resin comprising a polyhedral oligomeric silsesquioxane of interest is used.

In embodiments relating to an emulsification/aggregation process, a resin may be dissolved in a solvent, and may be mixed into an emulsion medium, for example water, such as, deionized water, optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide. When a stabilizer is used, the stabilizer may be present in amounts of from about 0.1% to about 5%, from about 0.5% to about 3% by weight of the resin. The stabilizer may be added to the mixture at ambient temperature, or may be heated to the mixture temperature prior to addition.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

In embodiments relating to an exemplified EA process. Following emulsification, toner compositions may be prepared by aggregating a mixture of a resin, an optional colorant, an optional wax and any other desired reactants in an emulsion, optionally, with surfactants as described above, and then optionally coalescing the aggregated mixture. A mixture may be prepared by adding an optional wax, an optional colorant or other materials, which may also be optionally in a dispersion, including a surfactant, to the emulsion comprising a resin-forming material, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing may be at from about 600 to about 4.000 rpm. Homogenization may be by any suitable means, including, for example, an IKA ULTRA TURRAX T50 probe homogenizer.

Aggregation

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same, as well as compounds comprising a metal ion.

The aggregating factor, as provided above, may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the $T_g$ of the resin or of a polymer.

The aggregating factor may be added to the mixture to form a toner in an amount of from about 0.1 part per hundred (pph) to about 1 pph, from about 0.25 pph to about 0.75 pph of the reaction mixture.

The aggregating factor may be metered into the mixture over time. For example, the factor may be added incrementally to the mixture over a period of from about 5 to about 240 minutes, from about 30 to about 200 minutes.

Addition of the aggregating factor also may be done while the mixture is maintained under stirred conditions, from about 50 rpm to about 1,000 rpm, from about 100 rpm to about 500 rpm; and at a temperature that is below the $T_g$ of the resin or polymer, from about 30° C. to about 90° C., from about 35° C. to about 70° C. The growth and shaping of the particles following addition of the aggregation factor may be accomplished under any suitable condition(s).

The particles may be permitted to aggregate until a predetermined desired particle size is obtained. Particle size may be monitored during the growth process, for example, with a COULTER COUNTER, for average particle size. The aggregation thus may proceed by maintaining the mixture, for example, at elevated temperature, or slowly raising the temperature, for example, from about 40° C. to about 100° C. and holding the mixture at that temperature for from about 0.5 hours to about 6 hours, from about hour 1 to about 5 hours, while maintaining stirring, to provide the desired aggregated particles. Once the predetermined desired particle size is attained, the growth process is halted.

Characteristics of the toner particles may be determined by any suitable technique and apparatus. Volume average particle diameter and geometric standard deviation may be measured using an instrument, such as, a Beckman Coulter MULTISIZER 3, operated in accordance with the instructions of the manufacturer.

In embodiments, the aggregate particles may be of a size of less than about 6 μm, from about 2 to about 5 μm, from about 2.5 μm to about 4.5 μm.

Coalescence

Following aggregation to a desired particle size and application of any optional shell, the particles may be coalesced to a desired final shape, such as, a circular shape, for example, to correct for irregularities in shape and size, coalescence being achieved by, for example, heating the mixture to a temperature from about 45° C. to about 100° C., from about 55° C. to about 99° C., which may be at or above the $T_g$ of the resins used to form the toner particles, and/or reducing the stirring, for example, from about 1000 rpm to about 100 rpm, from about 800 rpm to about 200 rpm. Coalescence may be conducted over a period from about 0.01 to about 9 hours, from about 0.1 to about 4 hours, see, for example, U.S. Pat. No. 7,736,831.

After aggregation and/or coalescence, the mixture may be cooled to room temperature, such as, from about 20° C. to about 25° C. The cooling may be rapid or slow, as desired. After cooling, the toner particles optionally may be washed with water and then dried.

Optionally, a coalescing agent may be used. Examples of suitable coalescence agents include, but are not limited to, benzoic acid alkyl esters, ester alcohols, glycol/ether-type solvents, long chain aliphatic alcohols, aromatic alcohols, mixtures thereof and the like.

The coalescence agent (or coalescing agent or coalescence aid agent) evaporates, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not impact any properties or the performance of the toner or developer.

The coalescence agent may be added prior to the coalescence or fusing step in any desired or suitable amount. For example, the coalescence agent may be added in an amount of from about 0.01 to about 10% by weight, based on the solids content in the reaction medium, from about 0.05, from about 0.1% to about 0.5, to about 3.0% by weight, based on the solids content in the reaction medium. Of course, amounts outside those ranges may be used, as desired.

In embodiments, the coalescence agent may be added at any time between aggregation and coalescence, although in some embodiments it may be desirable to add the coalescence agent after aggregation is, "frozen," or completed, for example, by adjustment of pH, for example, by addition, for example, of base.

Shells

An optional shell may be applied to the formed toner particles, aggregates or coalesced particles. Any polymer, including those described above as suitable for the core, such as, a bio-based, branched polymer, may be used for the shell. The shell polymer may be applied to the particles or aggregates by any method within the purview of those skilled in the art.

In embodiments, an amorphous polyester resin may be used to form a shell over the particles or aggregates to form toner particles or aggregates having a core-shell configuration. In embodiments, a low molecular weight amorphous polyester resin may be used to form a shell over the particles or aggregates.

Formation of the shell over the aggregated particles may occur while heating to a temperature from about 30° C. to about 80° C., from about 35° C. to about 70° C. Formation of the shell may take place for a period of time from about 5 minutes to about 10 hours, from about 10 minutes to about 5 hours.

The shell may be present in an amount from about 1% by weight to about 80% by weight of the toner components, from about 10% by weight to about 40% by weight of the toner components, from about 20% by weight to about 35% by weight of the toner components.

Optional Additives

Toner may include known charge additives in amounts of from about 0.1 to about 10 weight %, from about 0.5 to about 7 weight % of the toner. Examples include alkyl pyridinium halides, bisulfates, the charge control additives of U.S. Pat. Nos. 3,944,493; 4,007,293; 4,079,014; 4,394,430; and 4,560,635, the disclosure of each of which hereby is incorporated by reference in entirety.

Charge enhancing molecules may be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

Such enhancing molecules may be present in an amount of from about 0.1 to about 10%, from about 1 to about 3% by weight.

Surface Modifications

Surface additives may be added to the toner of the present disclosure, for example, after washing or drying. Examples of surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosure of each of which hereby is incorporated by reference in entirety.

Surface additives may be used in an amount of from about 0.1 to about 10 wt %, from about 0.5 to about 7 wt % of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosure of each of which hereby is incorporated by reference in entirety, also may be present. The additive may be present in an amount of from about 0.05 to about 5%, from about 0.1 to about 2% of the toner, which additives may be added during the aggregation or blended into the formed toner product.

Silica, for example, may enhance toner flow, tribo control, admix control, improved development and transfer stability and higher toner blocking temperature. Zinc, calcium or magnesium stearate also may provide developer conductivity, tribo enhancement, higher toner charge and charge stability. The external surface additives may be used with or without a coating or shell. Some additives are illustrated in U.S. Pat. Nos. 3,590,000, 3,800,588 and 6,214,507, the disclosure of each of which is incorporated herein by reference.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained metal ion in toner of the present disclosure may be from about 0.1 pph to about 1 pph, from about 0.25 pph to about 0.8 pph. The gloss level of a toner of the instant disclosure may have a gloss, as measured by Gardner gloss units (gu), from about 20 gu to about 100 gu, from about 50 gu to about 95 gu, from about 60 gu to about 90 gu.

Toner of the instant disclosure also may possess a parent toner charge per mass ratio (q/m) of from about −5 µC/g to about −90 µC/g, and a final toner charge after surface additive blending of from about −15 µC/g to about −80 µC/g.

The dry toner particles, exclusive of external surface additives, may have the following characteristics: (1) volume average diameter (also referred to as "volume average particle diameter") of from about 2.5 to about 20 µm, from about 2.75 to about 10 µm, from about 3 to about 7.5 µm; (2) number average geometric standard deviation (GSDn) and/or volume average geometric standard deviation (GSDv) of from about 1.18 to about 1.30, from about 1.21 to about 1.24; and (3) circularity of from about 0.9 to about 1.0 (measured with, for example, a Sysmex FPIA 2100 analyzer), from about 0.95 to about 0.985, from about 0.96 to about 0.98.

Developers

The toner particles thus formed may be formulated into a developer composition. For example, the toner particles may be mixed with carrier particles to achieve a two component developer composition. The toner concentration in the developer may be from about 1% to about 25% by weight of the total weight of the developer, from about 2% to about 15% by weight of the total weight of the developer, with the remainder of the developer composition being the carrier. However, different toner and carrier percentages may be used to achieve a developer composition with desired characteristics.

Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

Suitable carriers may include a core, for example, of from about 25 to about 100 µm in size, from about 50 to about 75 µm in size.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. The coating may have a coating weight of, for example, from about 0.1 to about 5% by weight of the carrier, from about 0.5 to about 2% by weight of the carrier. A coating may comprise a carbon black, see, for example, in U.S. Pat. Nos. 5,236,629 and 5,330,874.

The carrier particles may be prepared by mixing the carrier core with polymer in an amount from about 0.05 to about 10% by weight, from about 0.01 to about 3% by weight, based on the weight of the coated carrier particle, until adherence thereof to the carrier core is obtained, for example, by mechanical impaction and/or electrostatic attraction.

Devices Comprising a Toner Particle

Toners and developers may be combined with a number of devices ranging from enclosures or vessels, such as, a vial, a bottle, a flexible container, such as a bag or a package, and so on, to devices that serve more than a storage function.

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable. Such a device may comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

Imaging Devices

The toners or developers may be used for electrostatographic or electrophotographic processes, including those disclosed in U.S. Pat. No. 4,295,990, the disclosure of which hereby is incorporated by reference in entirety. Any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated. As used herein, "room temperature," (RT) refers to a temperature of from about 20° C. to about 30° C.

Examples

Into a 3-neck 250 ml round bottom flask fitted with a paddle stirrer, a thermocouple and a Dean Stark apparatus attached to a water cooled condenser were added 53.1 grams of 82% purity abietic acid (175 mmol; 1.0 equivalent weight) and 23.6 grams of 97% glycerine carbonate (200 mmol; 1.14 equivalent weight). The contents of the flask were heated with stirring under nitrogen. The temperature was gradually increased to 170° C. and held there for about 19 hours.

Once the esterified product was formed, 32.5 grams of succinic acid (276 mmol; 2.10 equivalent weight) and 1.181 grams of FASCAT 4100 catalyst were added to the flask, the reaction was heated at 210° C. and maintained for 32 hours until the softening point (Ts) of the resin reached 115.4° C. (The Ts of the resin was determined by the Mettler FP800 Thermosystem consisting of a FP80 Central Processor and a FP83 Dropping Cell. The temperature was programmed to increase at 1° C./min until the target Ts was reached.)

TABLE 1

Analytical Results for Branched Bio-Based Polyesters

| | Step 1 | | Step 2 | | | | | | | | |
|---|---|---|---|---|---|---|---|---|---|---|---|
| Resin ID | Abietic acid (~75%) | Glycerol Carbonate | Resin diol (from Step 1) | Succinic acid | Ts (° C.) | AV | Mw | Mn | PDI | $Tg_{(on)}$ | % Gel Content |
| Ex. 1 | 1.00 | 1.17 | 0.48 | 0.52 | 140.2 | 29.8 | 58,918 | 1220 | 48.3 | 33.3 | 0.0175 |
| Ex. 2 | 1.00 | 1.17 | 0.42 | 0.58 | 114.5 | 15.1 | 84,880 | 1506 | 56.3 | 34.1 | 0.0062 |
| Ex. 3 | 1.00 | 1.053 | 0.38 | 0.82 | 95.6 | 39.2 | 8448 | 1164 | 5.54 | 26.6 | 0.861 |
| Ex. 4 | 1.00 | 1.053 | 0.43 | 0.57 | 107.8 | 2.0 | 122,085 | 1086 | 64.5 | 38.2 | 0.00175 |
| Ex. 5 | 1.00 | 1.14 | 0.43 | 0.57 | 115.4 | 57.0 | 4163 | 1336 | 3.12 | 24.4 | 0.662 |
| Ex. 6 | 1.00 | 0.42 | 0.47 | 0.53 | 83.7 | 211.7 | 1931 | 701 | 2.76 | 7.3 | 0.619 |

As seen from the data in Table 1, most samples have very low gel content indicating very little to no cross-linking.

The viscosity curves of the polymers over time and temperature were comparable to that of a commercially available toner resin, although overall, the viscosity of the polymers of interest was a bit lower, indicating a degree of association or entanglement between and among chains. (Higher levels of branching are correlated with higher levels of gel content. The lower levels of branching of the polyesters indicate some degree of chain association, such as, entanglements within a polymer network where individual polymer chains are able to return to initial equilibrium orientation. Linear polyesters, such as, a commercially available control toner, do not present with a plateau in a viscosity curve because chain movement is not hindered by entanglements from branching along the polymer backbone and the chains can relax completely by reputation. Polymers with lower levels of branching possessed elasticity but a loss of energy in the loss moduli indicating a less developed crosslinked network.)

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:
1. A bio-based, branched polyester resin comprising:
   (i) a cyclic polyol resulting from condensation of:
      (a) glycerine carbonate, or glycerol carbonate and glycerol; and
      (b) a rosin acid selected from the group consisting of abietic acid, neoabietic acid, palustric acid, levopimaric acid, dihydroabietic acid, pimaric acid, isopimaric acid and combinations thereof;
   (ii) a polyacid selected from the group consisting of succinic acid, fumaric acid, maleic acid, itaconic acid, dodecylsuccinic acid, glutaric acid, adipic acid, pimelic acid, suberic acid and azelaic acid, and
   (iii) optionally, a condensation catalyst;
wherein said bio-based, branched polyester resin comprises 100% bio-based materials with substantially no gelation and a viscosity plateau at a temperature greater than about 110° C. and comprising an $M_n$ of from about 400 to about 1600.

2. The bio-based, branched polyester resin of claim 1, wherein said polyacid comprises succinic acid.

3. The bio-based, branched polyester resin of claim 1, wherein the rosin acid comprises abietic acid.

4. A toner comprising the bio-based, branched polyester resin of claim 1.

5. The toner of claim 4, further comprising a wax, a colorant or both.

6. The toner of claim 4, further comprising a bio-based, branched amorphous polyester resin.

7. The toner of claim 4, further comprising a non-bio-based polyester resin.

8. The toner of claim 4, further comprising a non-bio-based crystalline polyester resin.

9. The toner of claim 8, further comprising a non-bio-based amorphous polyester resin.

10. The toner of claim 4, comprising an emulsion aggregation toner.

11. The toner of claim 4, further comprising a shell.

12. A developer comprising the toner of claim 4.

13. The developer of claim 12, comprising a carrier.

14. The developer of claim 13, wherein said carrier comprises a resin.

* * * * *